July 17, 1934.                J. V. CAPUTO                 1,967,198
                   CONTROL SYSTEM FOR ELECTRIC WELDERS
                     Filed Nov. 12, 1931      4 Sheets-Sheet 1

INVENTOR
James V. Caputo
by his attorneys
Byrnes, Stebbins, Parmelee & Blenko

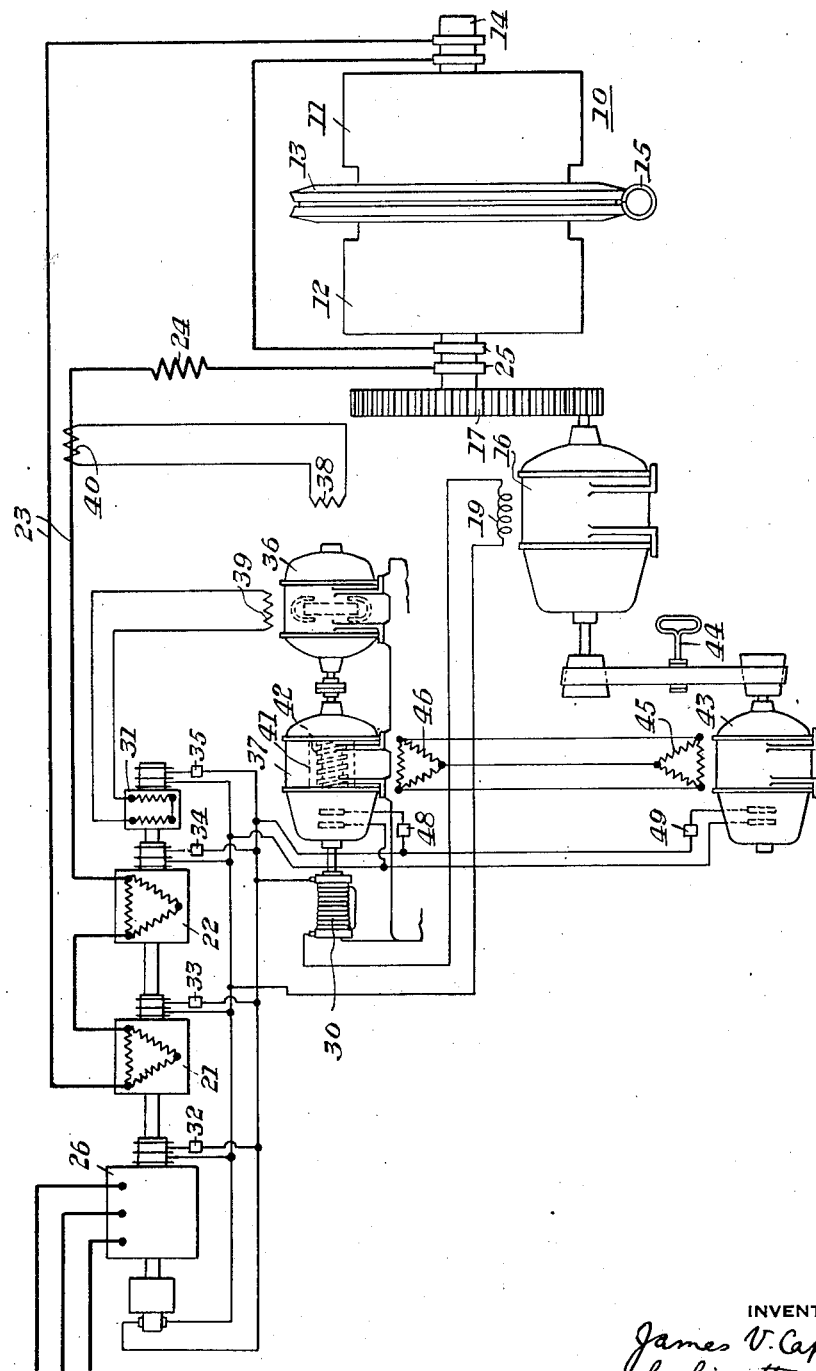

Fig. 3.

July 17, 1934. J. V. CAPUTO 1,967,198
CONTROL SYSTEM FOR ELECTRIC WELDERS
Filed Nov. 12, 1931 4 Sheets-Sheet 4

INVENTOR
James V Caputo
by his attorneys
Byrnes, Stebbins, Parmelee & Blenko

Patented July 17, 1934

1,967,198

UNITED STATES PATENT OFFICE 1,967,198

CONTROL SYSTEM FOR ELECTRIC WELDERS

James V. Caputo, Girard, Ohio

Application November 12, 1931, Serial No. 574,507

22 Claims. (Cl. 219—4)

My invention relates to electric welding and, in particular, to a system of control for a rotating electric welder such as that disclosed in my copending application, Serial No. 475,174, filed September 14, 1930, for continuously welding metal by the electrical-resistance method.

In my copending application, Serial No. 549,442, I have disclosed a system for controlling the voltage supplied to a rotating electrical-resistance welding machine, according to which I employ a pair of generators connected in series for supplying current to the primary windings of the transformers on the rotating welder. One of the generators has a substantially constant voltage and provision is made for varying the voltage of the other generator whereby the resultant voltage supplied to the welding transformers may be varied at will.

It is the object of this invention to provide an automatic control system for varying the voltage of the second generator in order to provide a constant welding heat in the lengths being welded, for example, formed tubes having axial seams.

Another object of the invention is to control the speed of the rotating electrode which supplies current to the seam being welded. It is obvious that the speed of travel of the seam and the current supplied thereto should be coordinated properly in order to maintain a constant welding heat, and the system of my invention accomplishes this result automatically.

In accordance with the invention, I employ means responsive to the speed of the rotating electrode, means responsive to the magnitude of current supplied thereto, and means responsive jointly to the speeds of the two first-mentioned means for varying either the magnitude of the current or the speed of the electrode to maintain proper relations therebetween.

For a complete understanding of the invention, reference is made to the accompanying drawings illustrating several present preferred embodiments of the system.

In the drawings,

Figure 1 is a diagrammatic view showing one form of the system;

Figure 2 is a similar view, showing a slightly modified system in which the speed of the electrode is controlled directly;

Figure 3 is a similar view, showing a system which is a modification of Figure 1.

Figure 4:
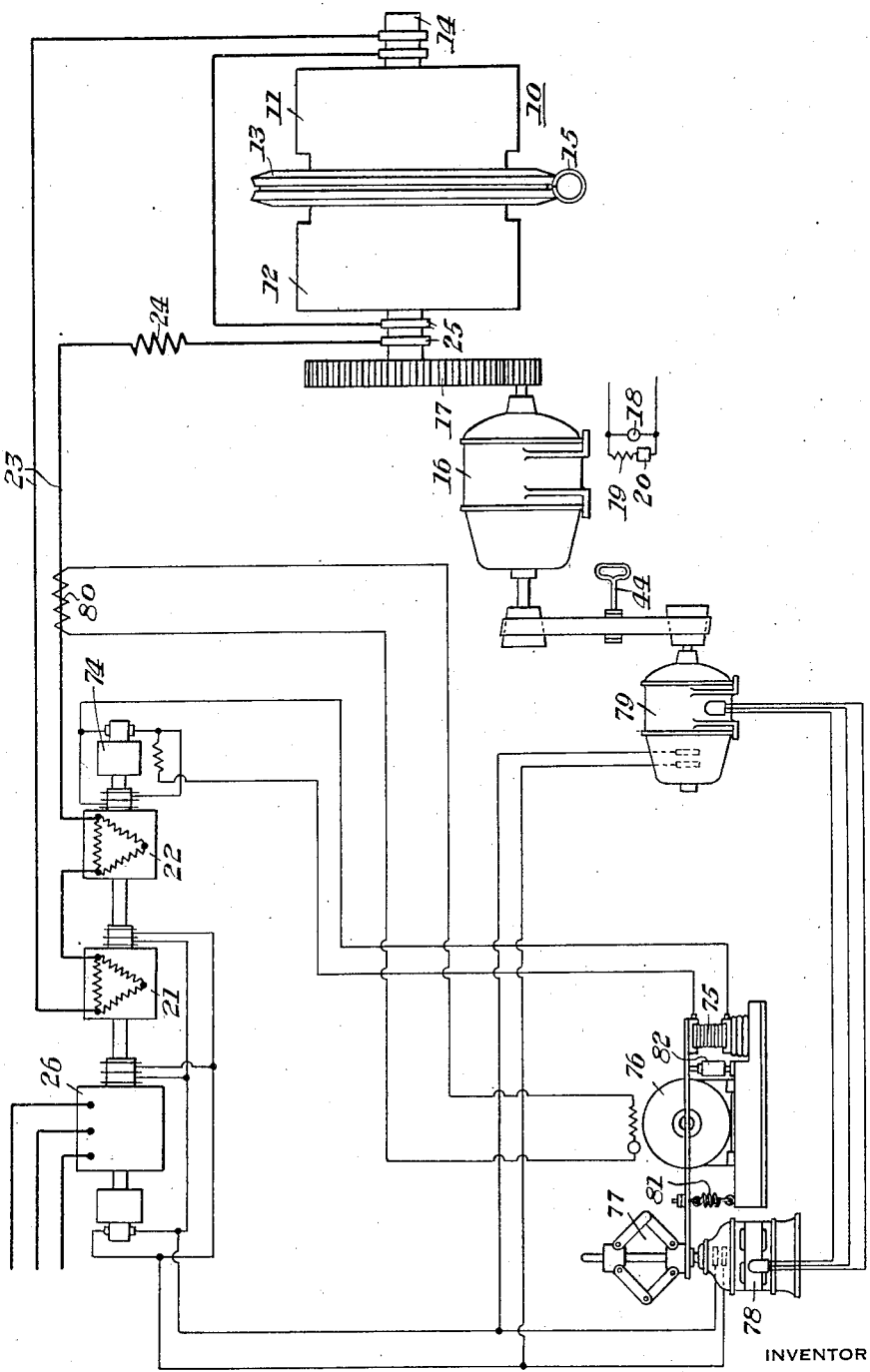
Figure 4 is a similar view illustrating a further modification.

Referring in detail to the drawings, a welder 10 comprises transformer groups 11 and 12 mounted on opposite sides of an electrode 13. The transformer groups and electrode are supported on a shaft 14 for rotation. Suitable means (not shown) are provided for supporting and feeding a formed tube 15 through the welder in tangential engagement with the electrode 13. The rotating system is driven by a motor 16 through gearing 17. The motor 16 is preferably a direct current shunt motor, the armature of which is indicated schematically at 18, the field winding at 19, and the field rheostat at 20. The rheostat is preferably manually adjustable to vary the speed of the electrode.

High voltage alternating current is supplied to the transformers in the groups 11 and 12 from generators 21 and 22 through a circuit 23, including a stabilizing reactor 24 and terminating at slip rings 25 on the shaft 14. The generators 21 and 22 are direct connected to a synchronous motor 26. The motor 26 may be connected to any suitable source of alternating current. The generator 21 is a constant voltage generator and a constant voltage exciter 27 on the shaft of the motor 26 supplies excitation for the generator, as well as for the motor itself.

The generator 22 is a variable voltage generator and derives its excitation from a variable voltage exciter 28. The field winding of the exciter 28 is indicated at 29 and includes in its circuit a carbon-pile rheostat 30 operated by automatic means to be described more fully later. A constant-voltage, single-phase alternating current generator 31 is carried on the shaft of a generator 22 for a purpose which will presently appear.

Manually operated rheostats 32, 33, 34, and 35 are provided for the field circuits of the motor 26 and the generators 21, 22, and 31.

In order to compare the electrode speed to the magnitude of the current supplied thereto, I provide a motor 36 and a motor 37 coupled together for jointly controlling the carbon-pile rheostat 30. The motor 36 is of the watthour meter type and has a current winding 38 and a voltage winding 39. The current winding 38 is energized by a current transformer 40 in the circuit 23. The voltage winding 39 is connected directly to the generator 31. As is well known, the watthour meter operates at a speed proportionate to the power traversing it. When a constant voltage is employed, the watthour meter speed varies in proportion to the magnitude of the current traversing it. The generator 31 produces such a constant voltage and the desired operation of the watthour meter motor results. In at least one example of the prior art, the voltage winding of a watthour meter motor is energized by the voltage across the welding circuit. This is not a constant voltage, of course, and erratic operation results. Any other type of motor responsive to the magnitude of the current supplied thereto might be used instead of the watthour meter motor.

The motor 37 is of the synchronous type but has a special rotor. The field winding 41 is not fixed to the shaft as usual but is loosely carried on a threaded shaft 42, which is coupled to the rotor of the motor 36 through a spline connection not shown. If the motor 36 operates at the same speed as the motor 37, the threaded shaft 42 and the rotor 41 will be in synchronism. If there is any difference in the speed of the motors 36 and 37, however, the shaft 42 will tend to move axially because of its threaded connection to the rotor 41. The axial movement of the shaft 42 is employed to apply or remove pressure on the carbon-pile rheostat 30.

The motor 37 is driven at a speed corresponding to that of the electrode 13 by means of an alternating current generator 43 having a belt connection to the electrode motor 16. A belt shifting mechanism 44 permits the speed of the generator 43 relative to that of the motor 16 to be varied. The motor 43 has armature windings 45 connected directly to stator windings 46 of the motor 37. A circuit 47 connects the field windings of the motor 37 and generator 43 to the constant voltage exciter 27 and manual rheostats 48 and 49 permit individual control of the excitation of these units.

The operation of the system shown in Figure 1 will now be described, assuming that the system is in operation under normal conditions, that is to say, the motor 26 is driving the generators and exciters connected thereto; the motor 16 is driving the electrode 13 and the motors 36 and 37 are operating at the same speed. The carbon-pile rheostat is adjusted so that under these conditions, the excitation supplied from the exciter 28 to the variable voltage generator 22 is sufficient to give the required voltage across the electrode of the rotating welder.

If the current supplied to the welder should decrease for any reason, such as increased resistance in the secondary circuit, this is immediately reflected by the slowing down of the motor 36. The difference in speed between the motors 36 and 37 causes an axial movement of the shaft 42 of the latter to increase the pressure on the carbon-pile rheostat 30 to increase the excitation for the exciter 28 and the generator 22 with the result that a higher voltage is applied to the welder transformers. If the current supplied to the welder should increase, the reverse operation would take place and the decrease in excitation of the variable voltage generator would bring the current back to normal value.

Similarly, if the speed of the electrode should increase, this would immediately influence the motor 37 and have a corresponding effect upon the adjustment of the excitation of the variable voltage generator. The motor 36 thus serves to maintain the welding current at the desired value for a given electrode speed and the motor 37 maintains a corresponding current supply for various speeds. In other words, these units provide an automatic control of the welding current in response to variations of the current from normal and variations in speed of the electrode.

Figure 2 illustrates a system similar in most respects to that of Figure 1, except that in Figure 2, the system serves to control the speed of the electrode motor instead of the excitation of the variable voltage generator. In Figure 2, the same reference numerals are used as in Figure 1 to indicate corresponding parts. The chief difference between Figures 2 and 1 is that, in Figure 2, the carbon-pile rheostat 30 controls the field winding 19 of the electrode motor 16 instead of a manual rheostat 20, as shown in Figure 1. The rest of the system is identical, except that the variable voltage exciter is not employed since the voltage of the generator 22 is adjusted by means of its manual rheostat 34 to give the desired welding current at normal electrode speed.

On any variation in welding current from the normal value, the units 36 and 37 operate the rheostat 30 to change the speed of the electrode motor. Conversely, any change in the electrode speed is reflected and tends to produce a restoration of the normal speed.

Figure 3:
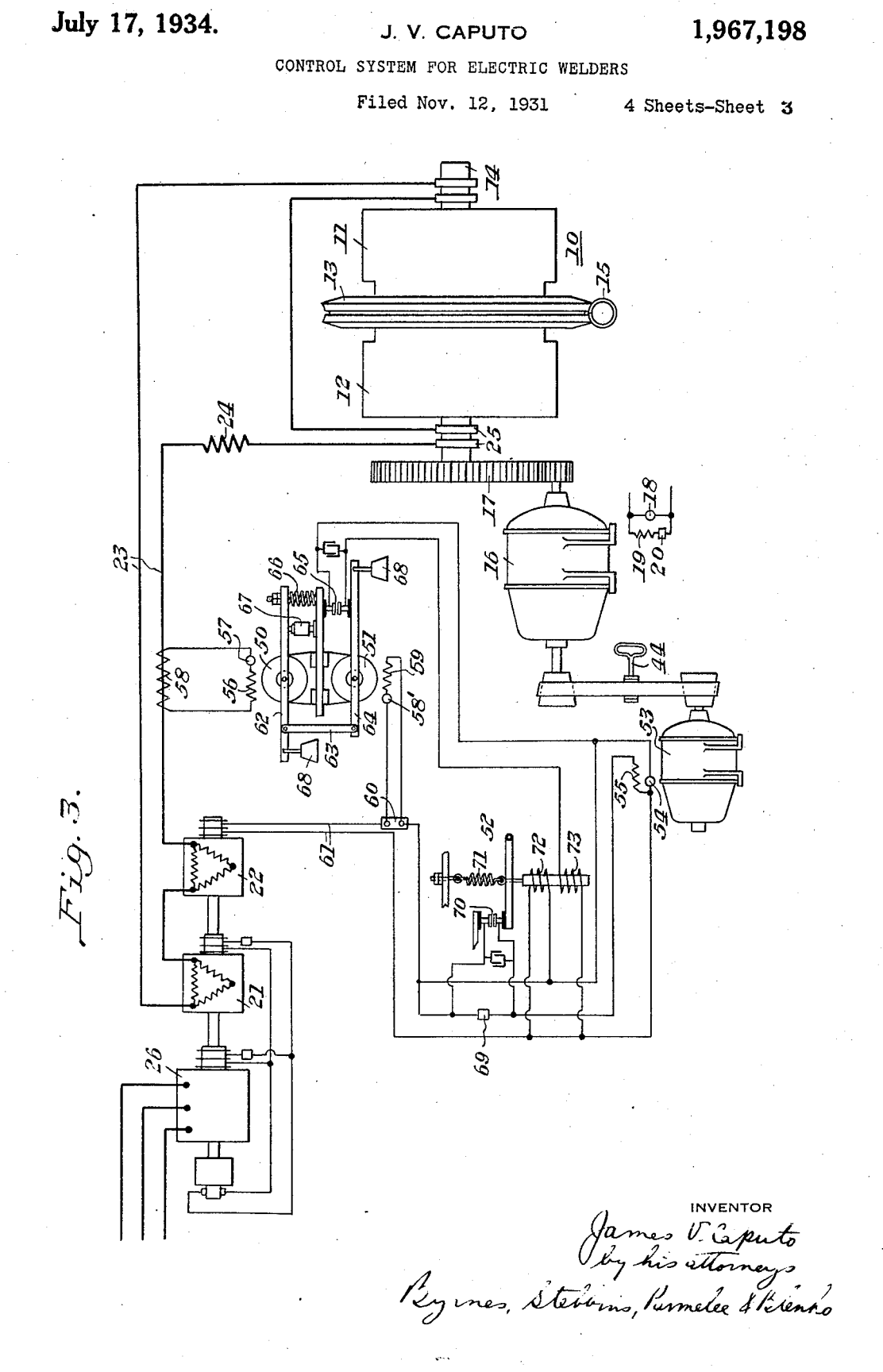

The system shown in Figure 1 and described above may, obviously, be employed to control the speed of the electrode motor, instead of the excitation of the variable voltage generator and so serve the same purpose as the system of Figure 2. The same statment applies to the systems of Figures 3 and 4 about to be described.

Figure 3 illustrates a modified form of system similar to that shown in Figure 1. In Figure 3, a generator 21 operates to produce a constant voltage as in Figures 1 and 2. The variable voltage generator 22 is controlled by alternating and direct current torque motors 50 and 51 and a Tirrill regulator 52. A direct current generator 53 having its armature and field windings indicated at 54 and 55, is driven by the electrode motor 16 through a belt connection and provides the variable excitation for the generator 22.

The torque motor 50 has its field winding and armature 56 and 57 connected in series to a current transformer 58 in the circuit 23. The direct current torque motor 51 has its armature and field winding 58' and 59 connected across a shunt 60 in the circuit 61 extending from opposite sides of the armature 54 of the exciter 53 to the field winding of the generator 22. The torque motor 50 cooperates with the torque motor 51 by means of links 62, 63, and 64 to control contacts 65. An adjusting spring 66 and a time delay dashpot 67 are also incorporated in the torque motor unit, as well as the adjusting weights 68.

The Tirrill regulator 52 is adapted to control a resistor 69 normally in circuit with the field winding 55 across the armature 54 of the generator 53. The regulator has contacts 70 which, when closed, shunt the resistor 69. An adjusting spring 71 tends to close the contacts 70 but a magnetizing coil 72 connected across the armature 54 opposes the spring and prevents contact closing. The differential winding 73 controlled by the contact 65 of the torque motors, when energized, neutralizes the magnetizing winding 72 and permits the contacts to be closed to shunt the resistor 69 and increase the excitation of the exciter 53. The result, of course, is that the voltage of the generator 22 is increased and the current supplied to the welder is likewise varied.

In the system of Figure 3, the regulator 52 vibrates continuously under normal conditions, as well as the torque motors. The combined operation of these devices, however, tends to maintain substantially constant conditions. An increase in welding current, for example, energizes the torque motor 50 so as to bring about a decrease in such current. An increase in the exciting current for the generator 22 is effective on the torque motor 51 to bring about a decrease to offset the increase. In this way, for any given electrode speed, the welding current is maintained substantially constant and if the electrode speed varies, the welding current automatically varies in correspondence therewith, because of the direct drive of the exciter 53 from the electrode motor 16.

Figure 4 illustrates a further modified form of system, somewhat similar to that of Figure 3 except that it embodies different apparatus. In Figure 4, the excitation of the variable voltage generator 22 is supplied by a direct connected exciter 74. The field winding of the exciter is controlled by a carbon-pile rheostat 75. The rheostat 75 responds jointly to the influence of an alternating current torque motor 76 and a centrifugal device 77. The latter is driven by a synchronous motor 78, which operates in synchronism with an alternating current generator 79 belted to the electrode motor 16. The torque motor 76 is connected in series with a current transformer 80 in the circuit 23.

An increase in the welding current is reflected through the transformer 80 and the torque motor 76 to release pressure on the carbon-pile rheostat 75, so that the excitation of the exciter 74 will be reduced to lower the voltage of the generator 22 and decrease the welding current.

The electrode speed varies the influence of the centrifugal device 77 on the rheostat 75. If the electrode speed increases, the centrifugal device tends to compress the rheostat 75 and increase the excitation to supply increased current at the higher speed. If the electrode speed decreases, the centrifugal device tends to release the rheostat and lower the welding current. The system shown in Figure 4 thus provides another means for maintaining a constant relation between welding current and electrode speed by balancing against each other certain variables proportional thereto. The operation of the rheostat 75 is further influenced by an adjusting spring 81 and a dashpot 82.

It will be apparent from the foregoing description that the invention comprises many advantages over the previous method of manually controlling the different variables involved in welding. Instead of relying on the vigilance of an operator to adjust the welding current and electrode speed to the proper values, as has been the practice heretofore, the invention provides automatic means for effecting the proper adjustments in the different variables as soon as any variation from the normal value occurs. The automatic system is much more sensitive than the manual operation and is also more accurate, since there is no tendency to effect excessive adjustments. As soon as the adjustment is commenced, the speed of adjustment begins to taper off because the adjusted variable becomes effective to reduce the adjusting tendency.

Although I have illustrated and described herein but a few preferred embodiments of the invention with certain modifications thereof, it will be apparent that it may be practiced in forms other than those shown and that it is not limited to the details of the systems illustrated, since the latter may be varied widely within the scope of the appending claims.

I claim:

1. In a welder, the combination with a rotary electrode and a variable voltage source for supplying current thereto, of means responsive jointly to the speed of the electrode and the magnitude of the current supplied thereto for controlling the voltage of said source.

2. In a welder, the combination with a rotary electrode and a variable voltage circuit for supplying current thereto, of a motor, means for driving said motor at a speed proportional to that of the electrode, a second motor, means for energizing the second motor in proportion to the magnitude of current supplied to the electrode, and means actuated by said motors jointly for controlling the voltage of said circuit.

3. In a welder, the combination with a rotary electrode and a variable voltage means for supplying current thereto, of a synchronous motor, a generator driven in accordance with the rotation of the electrode, for operating said motor, a second motor, means for energizing the second motor in proportion to the current supplied to the electrode, and means actuated by said motors jointly for controlling the voltage of said means.

4. In a welder, the combination with a rotary electrode and a variable voltage generator for supplying current thereto, of a synchronous motor, a generator driven in accordance with the rotation of the electrode, for operating said motor, a torque motor responsive to the current supplied to said electrode, and means responsive to the speed of the synchronous motor and the torque of the torque motor for controlling the voltage of said first-mentioned generator.

5. In a welder, the combination with a rotary electrode and a variable voltage generator for supplying current thereto, of a regulator for controlling the voltage of said generator having actuating and differential windings, means for energizing the actuating winding in proportion to the electrode speed, and means responsive jointly to the generator voltage and electrode current for rendering said differential winding effective.

6. In a welder, the combination with a rotary electrode and a variable voltage generator for supplying current thereto, of an exciter for the generator driven at a speed proportional to that of the electrode, a regulator for the generator having actuating and differential coils, a torque motor responsive to electrode current and a torque motor responsive to generator exciting current for jointly controlling the differential winding of the regulator, the actuating winding being connected directly to said exciter.

7. In a welder, the combination with a rotary electrode, and a driving motor for the electrode, of a motor driven at a speed proportional to that of the electrode, a motor driven at a speed proportional to the electrode current, and means responsive to a difference in the speed of said motors for controlling the speed of said electrode driving motor.

8. In a system for maintaining a constant relation between the flow of current from a generator to a rotary welding electrode and the speed of the electrode, a control device, means controlled thereby effective to vary said flow of current, and means actuating the control device including means responsive to the electrode speed and means responsive to the magnitude of the current.

9. In a welding apparatus, the combination with a rotary electrode and current supply means therefor, of means responsive to the magnitude of the current, means responsive to the electrode speed, and control means jointly actuated by said last mentioned means, effective to vary the current supplied to the electrode.

10. A control system for a welder having a rotary electrode and current supply means therefor, comprising means responsive to the electrode speed for varying the supply of current thereto, and current responsive means for opposing further variation of current.

11. A control system for a welder having a rotary electrode and a driving motor therefor, comprising a motor having current and voltage windings effective to drive it at a speed proportional to the current supplied to the electrode, a synchronous motor operated by a generator driven from the electrode motor, the rotor of the synchronous motor having threaded connection with the motor shaft, and the shaft being coupled to that of the second-mentioned motor, and means controlled by axial movement of said shaft effective to vary the current supplied to the electrode.

12. In a welder, the combination with a rotary electrode and a motor for driving it, of a generator for supplying current to the electrode, and an exciter for said generator driven by said electrode motor whereby the generator supplies current to the electrode in accordance with the speed of the latter.

13. In a welder, a rotary electrode, a driving motor therefor, a motor having a winding, means for energizing the motor winding in proportion to the electrode current, a generator driven by said electrode motor, a synchronous motor driven by said generator and having a rotor loosely threaded on an axially movable shaft coupled to the shaft of the second-mentioned motor, and means actuated by movement of said first mentioned shaft for controlling the speed of the electrode motor.

14. In a welder, a rotary electrode, a generator for supplying current to said electrode, a motor for driving said electrode, a motor driven in accordance with the electrode speed, a watt-hour meter motor having a current winding energized in accordance with the electrode current and a voltage winding energized by a constant voltage generator, and means controlled jointly by said second-mentioned motor and said watt-hour meter motor for controlling the current supplied from said generator to said electrode.

15. In an electric pipe welding device, the combination with means for feeding a formed pipe blank, of means for supplying welding current to the edges of the blank, and means for controlling the energy supplied by said second-mentioned means in accordance with the speed of travel of said blank.

16. A control system for a welder having a rotary electrode, a current supply means therefor and a connecting circuit therebetween, comprising means responsive to the voltage drop in a portion of said circuit, and means controlled by said voltage-drop responsive means effective to vary the current traversing said circuit so as to maintain the voltage drop in said portion substantially constant.

17. In a pipe welding device the combination with means for feeding a formed pipe blank, of means including a main circuit for supplying welding current to the edges of the blank, and means for maintaining a constant current in the circuit, said means constituting a regulator having actuating and differential windings, said actuating winding being energized in accordance with the voltage drop in the circuit.

18. In a welder, a rotary electrode and generator for supplying current to said electrode, a motor for driving said electrode, a watt-hour meter motor having a current winding energized in accordance with the electrode current and a voltage winding energized by a constant-voltage generator, and means controlled by said watt-hour meter motor for controlling the current supplied from said generator to said electrode.

19. In a welder, the combination with a rotary electrode and a variable voltage generator for supplying the current thereto, a circuit connecting the generator and electrode, and an exciter for said generator, of a regulator for controlling the voltage of said generator having actuating and differential windings, means for energizing the actuating windings responsive to the voltage drop in a portion of said circuit, and means responsive jointly to the exciter voltage and electrode current for rendering said differential winding effective.

20. In a welder, the combination with a rotary electrode and a variable voltage generator for supplying current thereto, a torque motor responsive to the current supply to said electrode, and means responsive to the torque of the torque motor for controlling the voltage of said generator.

21. In a system for maintaining a constant flow of current in a circuit connecting a current-supply source to a rotary welding electrode, a control device, means controlled thereby effective to vary the flow of current in said circuit, and means actuating the control device including means responsive to the voltage drop across a fixed portion of one side of the circuit.

22. An electric welding machine comprising means for advancing opposed metallic edges to be welded, means for causing a current flow between said edges, means for controlling the magnitude of said current, and means responsive to the speed at which said edges are advanced, for actuating said current control means.

JAMES V. CAPUTO.